(12) United States Patent
Wang et al.

(10) Patent No.: US 11,596,932 B2
(45) Date of Patent: Mar. 7, 2023

(54) TAIL GAS TREATMENT CATALYST, PREPARATION METHOD THEREFOR AND USE THEREOF

(71) Applicant: Sinocat Environmental Technology Co., Ltd., Chengdu (CN)

(72) Inventors: Yun Wang, Chengdu (CN); Yi Dan, Chengdu (CN); Hongyi Du, Chengdu (CN); Zan Zhu, Chengdu (CN); Tiantian Luo, Chengdu (CN); Yanhua Zhang, Chengdu (CN); Qin Wang, Chengdu (CN); Yun Li, Chengdu (CN); Qizhang Chen, Chengdu (CN); Yongxiang Cheng, Chengdu (CN)

(73) Assignee: Sinocat Environmental Technology Co., Ltd., Chengdu (CN)

( * ) Notice: Subject to any disclaimer, the term of this patent is extended or adjusted under 35 U.S.C. 154(b) by 127 days.

(21) Appl. No.: 17/040,523

(22) PCT Filed: May 30, 2019

(86) PCT No.: PCT/CN2019/089171
§ 371 (c)(1),
(2) Date: Sep. 22, 2020

(87) PCT Pub. No.: WO2020/073666
PCT Pub. Date: Apr. 16, 2020

(65) Prior Publication Data
US 2021/0001314 A1    Jan. 7, 2021

(30) Foreign Application Priority Data

Oct. 8, 2018   (CN) .......................... 201811168858.3

(51) Int. Cl.
| | | |
|---|---|---|
| *B01J 29/06* | (2006.01) | |
| *B01J 29/76* | (2006.01) | |
| *B01D 53/86* | (2006.01) | |
| *B01J 21/04* | (2006.01) | |
| *B01J 23/42* | (2006.01) | |
| *B01J 23/44* | (2006.01) | |
| *B01J 23/46* | (2006.01) | |
| *B01J 29/46* | (2006.01) | |
| *B01J 29/85* | (2006.01) | |
| *B01J 29/74* | (2006.01) | |
| *B01J 37/02* | (2006.01) | |
| *B01J 37/08* | (2006.01) | |

(52) U.S. Cl.
CPC ........ *B01J 29/7615* (2013.01); *B01D 53/865* (2013.01); *B01J 21/04* (2013.01); *B01J 23/42* (2013.01); *B01J 23/44* (2013.01); *B01J 23/462* (2013.01); *B01J 29/46* (2013.01); *B01J 29/743* (2013.01); *B01J 29/763* (2013.01); *B01J 29/85* (2013.01); *B01D 2258/0291* (2013.01); *B01J 37/0201* (2013.01); *B01J 37/0215* (2013.01); *B01J 37/082* (2013.01); *B01J 2229/18* (2013.01)

(58) Field of Classification Search
CPC ...... B01J 29/7615; B01J 29/46; B01J 29/743; B01J 29/763; B01J 29/85; B01J 2229/18; B01J 23/44; B01J 23/42; B01J 21/04; B01J 35/0006; B01J 37/0201; B01J 37/0215; B01J 37/082; B01J 37/0018; B01J 37/30; Y02A 50/20; Y02A 10/12; F23G 7/06
USPC ........ 502/60, 63, 64, 65, 66, 69, 71, 73, 74, 502/77, 527.12
See application file for complete search history.

(56) References Cited

U.S. PATENT DOCUMENTS

| | | |
|---|---|---|
| 5,179,053 A | 1/1993 | Subramanian et al. |
| 9,145,350 B2 | 9/2015 | Patience et al. |

(Continued)

FOREIGN PATENT DOCUMENTS

| | | |
|---|---|---|
| CN | 108136373 A | 6/2018 |
| CN | 108472636 A | 8/2018 |

(Continued)

OTHER PUBLICATIONS

International Search Report of International Application No. PCT/CN2019/089171 dated Aug. 23, 2019; 5 pgs.; China National Intellectual Property Administration; Beijing, Republic of China.

*Primary Examiner* — Elizabeth D Wood
(74) *Attorney, Agent, or Firm* — Andrew D. Fortney; Central California IP Group, P.C.

(57) ABSTRACT

Disclosed in the present invention is a tail gas treatment catalyst. The catalyst consists of a carrier, a first catalyst, and a second catalyst. The first catalyst and the second catalyst are provided on both ends of the carrier. The first catalyst can purify pollutants in tail gas. The second catalyst can purify a byproduct, ammonia, obtained by the purification by the first catalyst and pollutants that are not completely purified by the first catalyst. The second catalyst is of a double-layer structure; the lower layer consists of an oxygen storage material, aluminum oxide, and a second active component; the second active component is a composition of Pt and Pd, or a composition of Ce, Fe, Ni and Cu; the upper layer consists of a molecular sieve and a third active component; the third active component is Cu or a composition of Cu and Fe. The tail gas treatment catalyst of the present invention has high purification treatment efficiency, and can significantly reduce the emissions of $CH_4$, CO, and $NO_x$ in the tail gas, especially reduce the content of the byproduct, $NH_3$, so that the tail gas can meet China VI emission standards.

11 Claims, 2 Drawing Sheets

(56) References Cited

U.S. PATENT DOCUMENTS

2018/0214824 A1 8/2018 Dumbuya et al.
2018/0229224 A1 8/2018 Zheng et al.

FOREIGN PATENT DOCUMENTS

TAIL GAS TREATMENT CATALYST, PREPARATION METHOD THEREFOR AND USE THEREOF

This application is a national phase application of International Appl. No. PCT/CN2019/089171, filed May 30, 2019, and claims the benefit of Chinese Patent Application No. 201811168858.3, filed Oct. 8, 2018, incorporated herein by reference in its entirety.

TECHNICAL FIELD

The present invention relates to the technical field of tail gas treatment, and particularly to a tail gas treatment catalyst, a preparation method therefor and use thereof.

BACKGROUND ART

For heavy-duty natural gas vehicles, the combustion mode of the engine is upgraded from a lean combustion to a stoichiometric burn when the emission standard transitions from the China V emission standard to the China VI emission standard. Accordingly, post-treatment catalysts are upgraded from the methane oxidation catalyst (MOC) to the three way catalyst (TWC). Under a stoichiometric burn condition, TWC can convert HC (including $CH_4$ and NMHC), CO and $NO_x$ in the tail gas to $N_2$, $CO_2$ and $H_2O$. However, a byproduct of $NH_3$ will be produced during such a catalyzed conversion.

GB17691-2018, Limits and Measurement Methods for Pollutant Emissions from heavy-duty diesel vehicles (China VI phase), applies to heavy-duty natural gas vehicles and heavy-duty diesel vehicles, and the standard came into effect for natural gas vehicles from Jul. 1, 2019. Based on GB17691-2005, this standard not only further reduces the limits for CO, HC and $NO_x$, but also adds the limit requirement for $NH_3$ with respect to gaseous pollutants.

The three pollutants, CO, HC and $NO_x$, can be purified to less than the limits of the China VI phase by TWC. However, near the theoretical air-fuel ratio, especially under a relatively rich condition, CO, NO and $H_2$ react to produce $NH_3$ and $H_2O$. The emission of new byproduct $NH_3$ far beyond the requirement of the China VI phase emission regulation (the emission is 5-10 times the limit or more). It is necessary to purify the new byproduct $NH_3$ in order to meet the requirement of the regulation.

$NH_3$ is an unstable compound, which is easily oxidized at a certain temperature, and the oxidation products are typically $N_2$, $N_2O$ and NO. The difficulty for the reaction lies in the selectivity for oxidizing $NH_3$ to $N_2$ Ammonia oxidation catalysts (abbreviated as AOC) are already used in post-treatment on diesel vehicles. The tail gas temperature of a natural gas vehicle with stoichiometric burn is generally about 200° C. higher than that of a diesel vehicle. However, the selectivity of the ammonia oxidation catalyst used in the diesel vehicle for oxidizing $NH_3$ to $N_2$ will substantially decreased as the temperature increases to 450° C. or higher. Therefore, there is a substantially increased requirement for the selectivity of the ammonia oxidation catalyst used in the natural gas vehicle for oxidizing $NH_3$ to $N_2$ at high temperature.

In order to make the tail gas of the heavy-duty natural gas vehicle meet the China VI phase regulation, there is a need for developing a post-treatment catalyst which can purify HC, CO, $NO_x$, PM and $NH_3$ to values within the limits of the China VI phase simultaneously.

SUMMARY

An object of the present invention is to overcome the defect of existing tail gas treatment catalysts that new byproduct $NH_3$ in a tail gas cannot be effectively purified, providing a tail gas treatment catalyst which can effectively purify hydrocarbons, carbon monoxide, nitrogen oxides, particulate matters, and new byproduct $NH_3$ in a tail gas, a preparation method therefor, and use thereof.

In order to achieve the above object, the present invention provides the following technical solutions.

A tail gas treatment catalyst, wherein the catalyst consists of a carrier, a first catalyst, and a second catalyst, wherein the first catalyst and the second catalyst are disposed on both ends of the carrier, the first catalyst is capable of purifying $CH_4$, NMHC, CO and $NO_x$ in the tail gas, and the second catalyst is capable of purify a byproduct of $NH_3$ obtained after purification by the first catalyst and a portion of pollutants which are not completely purified by the first catalyst, wherein, the second catalyst has a double-layer structure, comprising: a lower layer consisting of an oxygen storage material, aluminum oxide and a second active component, wherein the second active component is a composition of Pt and Pd, or a composition of Ce, Fe, Ni and Cu, and an upper layer consisting of a molecular sieve and a third active component, wherein the third active component is Cu, or a composition of Cu and Fe.

The above-mentioned tail gas treatment catalysts consisting of three catalyst functional regions can be classified into unipolar segmented catalysts and bipolar catalysts. The former segment (or the former pole) of the catalyst consists of a carrier and the first catalyst, which is a three way catalyst and mainly purifies pollutants such as methane, non-methane hydrocarbons, carbon monoxide, nitrogen oxides, particulate matters in the tail gas to convert them to carbon dioxide, nitrogen gas and water. The latter segment (or the latter pole) of the catalyst consists of a carrier and the second catalyst, wherein the second catalyst is divided into an upper layer and a lower layer. The lower layer is an ammonia oxidation catalyst, and mainly oxidizes ammonia to nitrogen gas and a small portion of nitrogen monoxide. The upper layer is a passive selective reduction catalyst, and mainly converts ammonia and nitrogen monoxide to nitrogen gas and water. The latter segment (or the latter pole) of the catalyst mainly purifies the originally emitted ammonia in the tail gas or a new byproduct of ammonia obtained after purification by the former segment (or the former pole) of the catalyst, and pollutants such as methane, non-methane hydrocarbons, nitrogen oxides, and carbon monoxide which are not purified by the former segment (or the former pole) of the catalyst to convert them to carbon dioxide, nitrogen gas and water.

Further, a combined loading amount of both the upper layer and the lower layer of the second catalyst is 50-200 g/L, wherein a loading amount ratio of the upper layer to the lower layer is (0.1-10):1.

Preferably, a coating loading amount of the lower layer of the second catalyst is 0.1-150 g/L, a coating loading amount of the upper layer is 0.1-150 g/L, and the combined loading amount of both the upper layer and the lower layer is 50-200 g/L.

More preferably, the coating loading amount of the lower layer of the second catalyst is 10-100 g/L, the coating loading amount of the upper layer is 10-100 g/L, and the combined loading amount of both the upper layer and the lower layer is 100-180 g/L.

More preferably, the coating loading amount of the lower layer of the second catalyst is 30-80 g/L, the coating loading amount of the upper layer is 50-100 g/L, and the combined loading amount of both the upper layer and the lower layer is 150-180 g/L.

Further, when the second active component is a composition of Pt and Pd, a weight ratio of Pt to Pd is (10-1):(1-0).

Preferably, when the second active component is a composition of Pt and Pd, the weight ratio of Pt to Pd is (10-1):(1-0.5).

More preferably, when the second active component is a composition of Pt and Pd, the weight ratio of Pt to Pd is (10-5):(1-0.5).

Further, a content of the second active component in the lower layer of the second catalyst is 0.1-10 g/ft$^3$.

Preferably, the content of the second active component in the lower layer of the second catalyst is 1-10 g/ft$^3$.

More preferably, the content of the second active component in the lower layer of the second catalyst is 1-5 g/ft$^3$.

Further, the molecular sieve is one of Beta, ZSM-5, SSZ-13 or SAPO-34 small pore molecular sieve, or a combination thereof.

For a theoretical air-fuel ratio condition or a leaner condition (with excess oxygen), the second catalyst is formed by applying precious metal as the lower layer and applying a molecular sieve as the upper layer respectively. A precious metal catalyst essentially consisting of two metals, Pt and Pd, or a transition metal catalyst essentially consisting of transition metals such as Ce, Fe, Ni, and Cu is used as the lower layer. The $NH_3$ emitted from the engine and the $NH_3$ produced from the side reaction of the three way catalyst are mainly converted to $N_2$, and a portion of CO, $CH_4$ and NMHC which are not converted by the three way catalyst are converted to $CO_2$ and $H_2O$. A catalyst, which is prepared by using Cu, or Cu and Fe as the active components and using one or more of Beta, ZSM-5, SSZ-13 or SAPO-34 small pore molecular sieve as the carrier, is used as the upper layer. HC-SCR and $NH_3$-SCR reactions occur, converting $NH_3$, $NO_x$, and $CH_4$ to $N_2$, $CO_2$ and $H_2O$. The content, ratio and coating loading amount of the active components in the second catalyst can be adjusted depending on the practical tail gas emission characteristics of the engine.

Further, the first catalyst consists of an oxygen storage material, aluminum oxide, an auxiliary agent and a first active component, wherein the first active component is a composition of Pt, Pd and Rh.

Further, a weight ratio of Pt, Pd and Rh in the first active component is (0-50):(1-100):(1-10).

Preferably, the weight ratio of Pt, Pd and Rh in the first active component is (10-50):(20-100):(3-10).

Preferably, the weight ratio of Pt, Pd and Rh in the first active component is (20-50):(50-100):(3-8).

A coating loading amount of the first catalyst on a dry basis is 100-250 g/L, and a content of the first active component is 50-200 g/ft$^3$.

The first catalyst is a Pt/Pd/Rh type three way catalyst with three precious metals of Pt, Pd and Rh as main active components, or a Pd/Rh type three way catalyst with two precious metals of Pd and Rh as main active components, and converts $CH_4$, NMHC, CO, $NO_x$ and particulate matters in the tail gas to $CO_2$, $N_2$ and $H_2O$ near a theoretical air-fuel ratio. The content, ratio and coating loading amount of the active components in the first catalyst can be adjusted depending on the practical tail gas emission characteristics of the engine.

Further, a volume ratio of the first catalyst to the second catalyst is (0.5-10):1.

Preferably, the volume ratio of the first catalyst to the second catalyst is (0.5-5):1.

Preferably, the volume ratio of the first catalyst to the second catalyst is (1-3):1.

In the above-mentioned tail gas treatment catalyst, the carrier is preferably a cordierite carrier, the catalytic material is preferably a mixture of an oxygen storage material and aluminum oxide, and the auxiliary agent is cerium nitrate, barium nitrate or so on. Among the active components, Pt component mainly functions to oxidize CO and HC in the catalyst, and can reduce NO to some extent. However, at a higher CO concentration or in the presence of $SO_2$, the effect of Pt is not as good as Rh. Rh component is a main component for catalytically reducing nitrogen oxides. In the presence of oxygen, the main reduction product is $N_2$ with only a small amount of $NH_3$ produced. When there is no oxygen or the oxygen content is less than the stoichiometric ratio, for the reduction products, the production of $NH_3$ is significantly increased in addition to $N_2$. Pd component is mainly used for converting CO and hydrocarbons. Pd component has less effect on saturated hydrocarbons, has poor resistance to S poisoning, and is prone to high temperature sintering, but it has good stability and good ignition property. The auxiliary agent is an additive which has no catalytic effect or has relatively low activity itself, but can greatly improve the activity, selectivity and service life of the catalyst. Cerium oxide is the most commonly used auxiliary agent for the vehicle tail gas purification catalyst, and mainly functions to: storage and release oxygen; improve the dispersion of the precious metals; prevent the precious metal particles from forming an inactive solid solution with aluminum oxide; improve the resistance to poisoning of the catalyst; improve the stability of the catalyst; and so on.

The present invention also provides a method for preparing the above-mentioned tail gas treatment catalyst, comprising steps as follows.

1) Preparation of the first catalyst, comprising the following steps.

S01. Impregnating a precursor of a first active component into surfaces of an oxygen storage material and aluminum oxide, then drying at 60-120° C. for 2-10 hours, and calcining at 350-600° C. under an atmosphere of air for 2-5 hours to obtain M-1. For example, the materials are dried at 90° C. for 6 hours, and calcined at 475° C. under an atmosphere of air for 3.5 hours to obtain M-1.

The precursor of the first active component is impregnated into the surfaces of the oxygen storage material and aluminum oxide by an equivalent volume impregnation process, with the proportion of the simple substance of the first active component controlled to 0-6%.

S02. Mixing M-1 with 1-5 wt. % of binder, ball milling the obtained mixture to produce a slurry, and adding 0-5 wt. % of auxiliary agent to the slurry in an amount calculated as an oxide of the auxiliary agent to obtain a slurry of the first catalyst, N-1. For example, the amount of the binder added is 3%, and the amount of the auxiliary agent added is 2.5%.

The binder includes, but not limited to, alumina sol and silica sol. During the ball milling, the solid content of the slurry is controlled to 25-50%.

2) Preparation of the second catalyst, comprising the following steps.

S01. Impregnating a precursor of a second active component into surfaces of an oxygen storage material and aluminum oxide, then drying at 60-120° C. for 2-10 hours, and calcining at 350-600° C. under an atmosphere of air for 2-5 hours to obtain M-2. For example, the materials are dried at 90° C. for 6 hours, and calcined at 475° C. under an atmosphere of air for 3.5 hours to obtain M-2.

The precursor of the second active component is impregnated into the surfaces of the oxygen storage material and aluminum oxide by an equivalent volume impregnation process, with the proportion of the simple substance of the second active component controlled to 0-1%.

S02. Mixing M-2 with 1-5 wt. % of binder, ball milling the obtained mixture to produce a slurry, and adding 0-5 wt. % of auxiliary agent to the slurry in an amount calculated as an oxide of the auxiliary agent to obtain a slurry of a lower layer of the second catalyst, N-2. For example, the amount of the binder added is 3%, and the amount of the auxiliary agent added is 2.5%.

The binder includes, but not limited to, alumina sol and silica sol. During the ball milling, the solid content of the slurry is controlled to 25-50%.

S03. Exchanging a precursor of a third active component into a framework of a molecular sieve by an ion exchange process, filtering, washing, then drying at 60-120° C. for 2-10 hours, and calcining at 350-650° C. under an atmosphere of air for 2-8 hours to obtain M-3. For example, the materials are dried at 90° C. for 6 hours, and calcined at 500° C. under an atmosphere of air for 5 hours to obtain M-3.

The amount of the ions exchanged is controlled such that the proportion of the simple substance of the third active component is 0-3%.

S04. Mixing M-3 with 1-5 wt. % of binder, ball milling the obtained mixture to produce a slurry, and adding 0-5 wt. % of auxiliary agent to the slurry in an amount calculated as an oxide of the auxiliary agent to obtain a slurry of an upper layer of the second catalyst, N-3. For example, the amount of the binder added is 3%, and the amount of the auxiliary agent added is 2.5%.

The binder includes, but not limited to, alumina sol and silica sol. During the ball milling, the solid content of the slurry is controlled to 25-50%.

3) Preparation of the tail gas treatment catalyst, comprising: applying the slurry N-1 on one end of a carrier, sequentially applying the slurry N-2 and the slurry N-3 on the other end of the carrier, then drying at 60-120° C. for 2-10 hours, and calcining at 350-600° C. under an atmosphere of air for 2-8 hours to obtain the tail gas treatment catalyst. For example, the materials are dried at 90° C. for 6 hours, and calcined at 475° C. under an atmosphere of air for 5 hours to obtain the tail gas treatment catalyst.

In the above-mentioned preparation method, the precursors of the active components refer to nitrate, tetraamine nitrate or another inorganic salt of each of the active components. For example, the precursors of the active components are platinum nitrate, palladium nitrate, rhodium nitrate, tetraamineplatinum nitrate, tetraaminepalladium nitrate, chloroplantinic acid and so on. The solution of the active component precursor may be a solution of single active component precursor, a mixed solution of multiple active component precursor, or a mixed solution of a precursor solution and an auxiliary agent solution.

The present invention also provides use of the above-mentioned tail gas treatment catalyst in purifying a tail gas of a natural gas vehicle.

As compared to the existed technologies, the present invention has the following advantageous effects.

For the tail gas treatment catalyst of the present invention, the first catalyst can purify NO, HC and CO in the tail gas, and the second catalyst can purify the originally emitted $NH_3$ in the tail gas and the byproduct $NH_3$ of the first catalyst reaction and purify NO, HC and CO which are not completely reacted in the former segment purification. The purification is efficient, and can significantly reduce the contents of various polluting gases, especially the new byproduct $NH_3$, in the tail gas, thereby meeting the emission requirements of the China VI phase.

Reference Number List: 1: the carrier, 2: the first catalyst, 3: the second catalyst, 31: the lower layer of the second catalyst, and 32: the upper layer of the second catalyst

DETAILED DESCRIPTION

The present invention will be further described in detail below with reference to experimental examples and particular embodiments. However, it should not be understood that the scope of the above subject matter of the present invention is only limited to the following examples, but all technologies achieved based on the present disclosure fall within the scope of the present invention.

The instruments and materials used in the examples are all known commercially available products, and can be obtained by purchasing the commercially available products.

BASIC EXAMPLE

Figure 1:
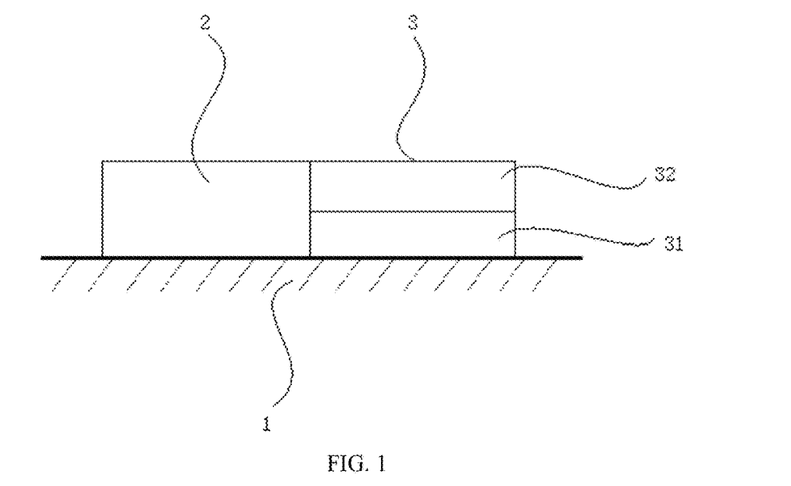
FIG. 1 is a schematic structure diagram of a unipolar segmented tail gas treatment catalyst according to an embodiment of the present invention.
Figure 2:
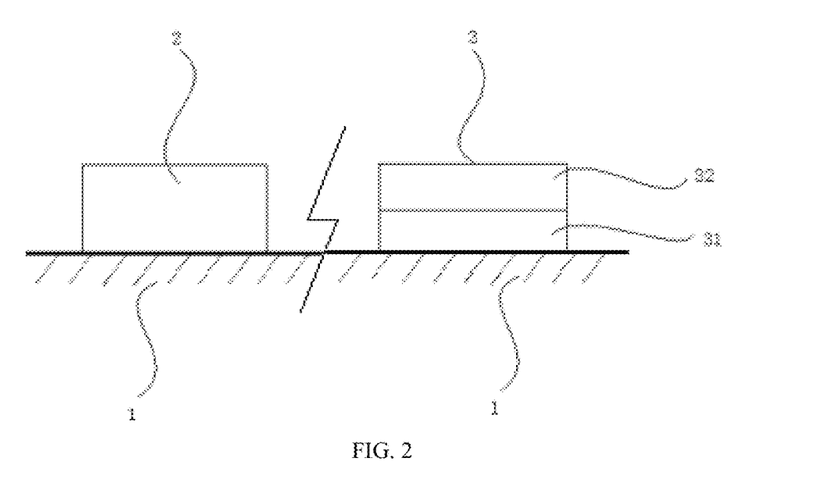
FIG. 2 is a schematic structure diagram of a bipolar tail gas treatment catalyst according to an embodiment of the present invention.

FIG. 1 or FIG. 2 shows a tail gas treatment catalyst, wherein the catalyst consists of a carrier, a first catalyst, and a second catalyst, wherein the first catalyst and the second catalyst are disposed on both ends of the carrier, the first catalyst is capable of purifying $CH_4$, NMHC, CO and $NO_x$ in the tail gas, and the second catalyst is capable of purify a byproduct of $NH_3$ obtained after purification by the first catalyst and a portion of pollutants which are not completely purified by the first catalyst, wherein, The second catalyst 3 has a double-layer structure, comprising: a lower layer 31 consisting of an oxygen storage material, aluminum oxide and a second active component, wherein the second active component is a composition of Pt and Pd, or a composition of transition metals such as Ce, Fe, Ni and Cu; and an upper layer 32 consisting of a molecular sieve and a third active component, wherein the third active component is Cu, or a composition of Cu and Fe.

Figure 3:
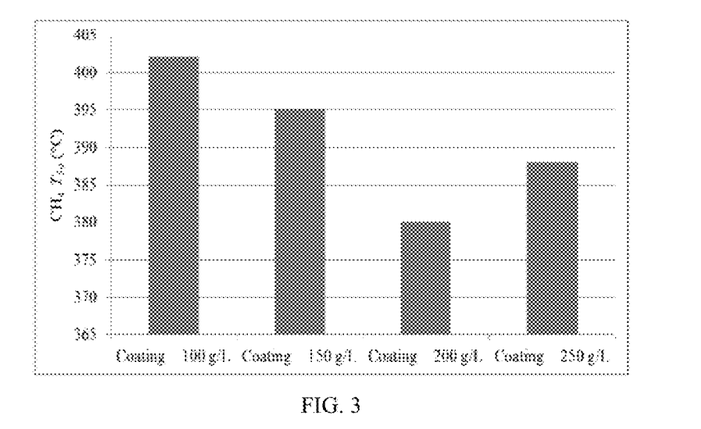
FIG. 3 shows effects of different coating loading amounts of the first catalyst on the ignition temperature of $CH_4$ ($T_{50}$).
Figure 4:
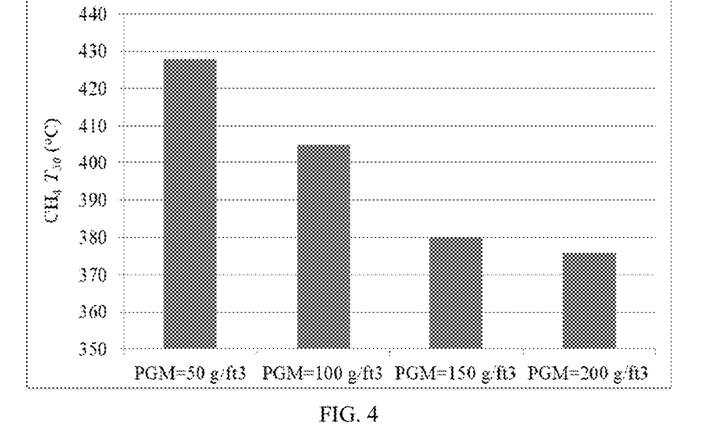
FIG. 4 shows effects of different precious metal contents of the first catalyst on the ignition temperature of $CH_4$ ($T_{50}$).

The type of the first catalyst 2 is not particularly defined, as long as it can purify the pollutants such as methane, non-methane hydrocarbons, carbon monoxide, nitrogen oxides and particulate matters in the tail gas to convert them to carbon dioxide, nitrogen gas and water. For example, the first catalyst 2 is a three way catalyst consisting of an oxygen storage material, aluminum oxide, an auxiliary agent, and a first active component, wherein the first active component is a composition of Pt, Pd and Rh, and a weight ratio of Pt, Pd and Rh is (0-50):(1-100):(1-10). Preferably, the weight ratio of Pt, Pd and Rh in the first active component is (10-50): (20-100):(3-10), and more preferably (20-50):(50-100):(3-8). For example, the weight ratio of Pt, Pd and Rh in the first active component may be 0:1:1, 50:100:10, 15:35:3, 35:75: 5, or so on. The first catalyst 2 is applied to the surface of a carrier 1. The coating loading amount on a dry basis is 100-250 g/L. The content of the first active component is 50-200 g/ft$^3$. For example, FIG. 3 shows a comparison between the ignition temperatures of $CH_4$ ($T_{50}$) for the coating loading amounts of the first catalyst 2 at 100 g/L, 150 g/L, 200 g/L and 250 g/L, and FIG. 4 shows a comparison between the ignition temperatures of $CH_4$ ($T_{50}$) for the contents of the first active component in the first catalyst 2 at 50 g/ft$^3$, 100 g/ft$^3$, 150 g/ft$^3$ and 200 g/ft$^3$.

A combined loading amount of both the upper layer and the lower layer of the second catalyst 3 is 50-200 g/L, wherein a loading amount ratio of the upper layer to the lower layer is (0.1-10):1.

Preferably, a coating loading amount of the lower layer 31 of the second catalyst is 0-150 g/L, a coating loading amount of the upper layer 32 is 0-150 g/L, and the combined loading amount of both the upper layer and the lower layer is 50-200 g/L.

More preferably, the coating loading amount of the lower layer 31 of the second catalyst is 10-100 g/L, the coating loading amount of the upper layer 32 is 10-100 g/L, and the combined loading amount of both the upper layer and the lower layer is 100-180 g/L.

More preferably, the coating loading amount of the lower layer 31 of the second catalyst is 30-80 g/L, the coating loading amount of the upper layer 32 is 50-100 g/L, and the combined loading amount of both the upper layer and the lower layer is 150-180 g/L.

For example, the combined loading amount of both the upper layer and the lower layer of the second catalyst 3 is 100 g/L, the loading amount of the upper layer 32 is 50 g/L, the loading amount of the lower layer 31 is 50 g/L. Alternatively, the combined loading amount of both the upper layer and the lower layer of the second catalyst 3 is 130 g/L, the loading amount of the upper layer 32 is 75 g/L, the loading amount of the lower layer 31 is 55 g/L. Alternatively, the combined loading amount of both the upper layer and the lower layer of the second catalyst 3 is 165 g/L, the loading amount of the upper layer 32 is 85 g/L, the loading amount of the lower layer 31 is 80 g/L. Alternatively, the combined loading amount of both the upper layer and the lower layer of the second catalyst 3 is 180 g/L, the loading amount of the upper layer 32 is 100 g/L, the loading amount of the lower layer 31 is 80 g/L. Alternatively, the combined loading amount of both the upper layer and the lower layer of the second catalyst 3 is 80 g/L, the loading amount of the upper layer 32 is 50 g/L, the loading amount of the lower layer 31 is 30 g/L.

When the second active component is a composition of Pt and Pd, a weight ratio of Pt to Pd is (10-1):(1-0).

Preferably, when the second active component is a composition of Pt and Pd, the weight ratio of Pt to Pd is (10-1):(1-0.5).

More preferably, when the second active component is a composition of Pt and Pd, the weight ratio of Pt to Pd is (10-5):(1-0.5).

Figure 5:
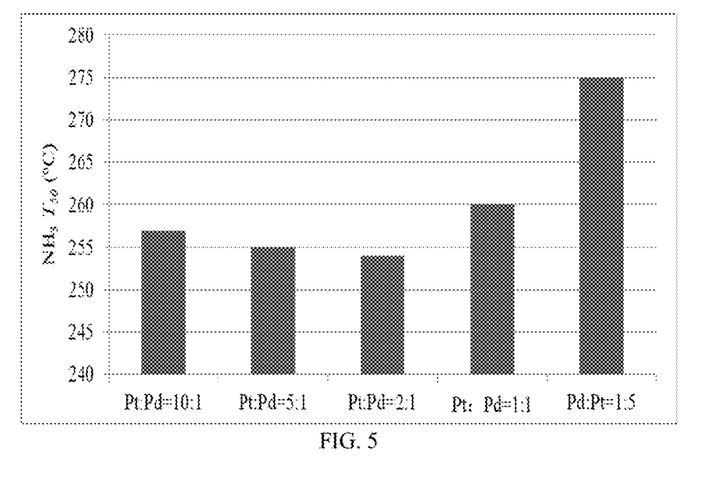
FIG. 5 shows effects of different Pt/Pd ratios of the second catalyst on the ignition temperature of $NH_3$ ($T_{50}$).

For example, the weight ratio of Pt to Pd in the second active component may be 10:1, 5:0, 2:1, 1:1, or 1:5. FIG. 5 shows a comparison between the ignition temperatures of $NH_3$ ($T_{50}$) for the weigh ratios of Pt and Pd of the second active component in the lower layer 31 of the second catalyst at 10:1, 5:0, 2:1, 1:1 and 1:5.

A content of the second active component in the lower layer 31 of the second catalyst is 0.1-10 g/ft$^3$.

Preferably, the content of the second active component in the lower layer of the second catalyst is 1-10 g/ft$^3$.

More preferably, the content of the second active component in the lower layer 31 of the second catalyst is 1-5 g/ft$^3$.

Figure 6:
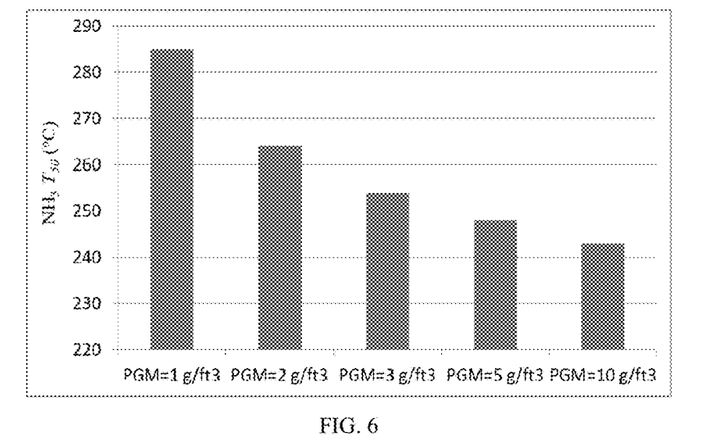
FIG. 6 shows effects of different precious metal contents of the second catalyst on the ignition temperature of $NH_3$ ($T_{50}$).

For example, the content of the second active component in the lower layer 31 of the second catalyst may be 1 g/ft$^3$, 2 g/ft$^3$, 3 g/ft$^3$, 5 g/ft$^3$, or 10 g/ft$^3$. FIG. 6 shows a comparison between the ignition temperatures of $NH_3$ ($T_{50}$) for the combined amounts of Pt and Pd of the second active component in the lower layer 31 of the second catalyst at 1 g/ft$^3$, 2 g/ft$^3$, 3 g/ft$^3$, 5 g/ft$^3$ and 10 g/ft$^3$ at a Pt/Pd ratio of 2:1.

The molecular sieve in the upper layer 32 of the second catalyst is one of Beta, ZSM-5, SSZ-13 or SAPO-34 small pore molecular sieve, or a combination thereof. For example, the molecular sieve may be a composition of Beta or ZSM-5 with SSZ-13.

For a theoretical air-fuel ratio condition or a leaner condition (with excess oxygen), the second catalyst 3 is formed by applying precious metal as the lower layer and applying a molecular sieve as the upper layer respectively. A precious metal catalyst essentially consisting of two metals, Pt and Pd, or a transition metal catalyst essentially consisting of transition metals such as Ce, Fe, Ni, and Cu is used as the lower layer 31. The $NH_3$ emitted from the engine and the $NH_3$ produced from the side reaction of the three way catalyst are mainly converted to $N_2$, and a portion of CO, $CH_4$ and NMHC which are not converted by the three way catalyst are converted to $CO_2$ and $H_2O$. A catalyst, which is prepared by using Cu, or Cu and Fe as the active components and using one or more of Beta, ZSM-5, SSZ-13 or SAPO-34 small pore molecular sieve as the carrier, is used as the upper layer 32. HC-SCR and $NH_3$-SCR reactions occur, converting $NH_3$, $NO_x$, and $CH_4$ to $N_2$, $CO_2$ and $H_2O$. The content, ratio and coating loading amount of the active components in the second catalyst can be adjusted depending on the practical tail gas emission characteristics of the engine.

A volume ratio of the first catalyst 2 to the second catalyst 3 is (0.5-10):1.

Preferably, the volume ratio of the first catalyst to the second catalyst is (0.5-5):1.

More preferably, the volume ratio of the first catalyst 2 to the second catalyst 3 is (1-3):1.

For example, the volume ratio of the first catalyst 2 to the second catalyst 3 may be 1:2, 1:1, 2:1, 3:1, 5:1, or so on.

The above-mentioned tail gas treatment catalysts can be classified into unipolar segmented catalysts and bipolar catalysts, consisting of three catalysts. FIG. 1 shows a unipolar segmented catalyst. FIG. 2 shows a bipolar catalyst. The former segment (or the former pole) of the catalyst consists of a carrier 1 and the first catalyst 2, which is a three way catalyst and mainly purifies pollutants such as methane, non-methane hydrocarbons, carbon monoxide, nitrogen oxides, particulate matters in the tail gas to convert them to carbon dioxide, nitrogen gas and water. The latter segment (or the latter pole) of the catalyst consists of a carrier 1 and the second catalyst 3, wherein a lower layer of the second catalyst 3 is an ammonia oxidation catalyst, and mainly oxidizes ammonia to nitrogen gas and a small portion of nitrogen monoxide, while an upper layer is a passive selective reduction catalyst, and mainly converts ammonia and nitrogen monoxide to nitrogen gas and water. The latter segment (or the latter pole) of the catalyst mainly purifies the originally emitted ammonia in the tail gas or a new byproduct of ammonia obtained after purification by the former segment (or the former pole) of the catalyst, and pollutants such as methane, non-methane hydrocarbons, nitrogen oxides, and carbon monoxide which are not purified by the former segment (or the former pole) of the catalyst to convert them to carbon dioxide, nitrogen gas and water.

In the above-mentioned tail gas treatment catalyst, the carrier 1 is preferably a cordierite carrier, the catalytic material is preferably a mixture of an oxygen storage material and aluminum oxide, and the auxiliary agent is cerium nitrate, barium nitrate or so on. Among the active components, Pt component mainly functions to oxidize CO and HC in the catalyst, and can reduce NO to some extent. However, at a higher CO concentration or in the presence of $SO_2$, the effect of Pt is not as good as Rh. Rh component is a main component for catalytically reducing nitrogen oxides. In the presence of oxygen, the main reduction product is $N_2$ with only a small amount of $NH_3$ produced. When there is no oxygen or the oxygen content is less than the stoichiometric ratio, for the reduction products, the production of $NH_3$ is significantly increased in addition to $N_2$. Pd component is mainly used for converting CO and hydrocarbons. Pd component has less effect on saturated hydrocarbons, has poor resistance to S poisoning, and is prone to high temperature sintering, but it has good stability and good ignition property. The auxiliary agent is an additive which has no catalytic effect or has relatively low activity itself, but can greatly improve the activity, selectivity and service life of the catalyst. Cerium oxide is the most commonly used auxiliary agent for the vehicle tail gas purification catalyst, and mainly functions to: storage and release oxygen; improve the dispersion of the precious metals; prevent the precious metal particles from forming an inactive solid solution with aluminum oxide; improve the resistance to poisoning of the catalyst; improve the stability of the catalyst; and so on.

COMPARATIVE EXAMPLE

A palladium nitrate solution and a rhodium nitrate solution were loaded onto an oxygen storage material (OSM) and aluminum oxide ($Al_2O_3$) by an equivalent volume impregnation process respectively. The materials were dried at 80° C. for 6 h, and calcined at 500° C. for 2 h. Here, the palladium material was denoted as M1-1, and the rhodium material was denoted as M1-2.

M1-1 was mixed with a binder of an alumina sol to obtain a mixture with 3% of binder. The mixture was ball milled for 10 min to obtain a slurry N1-1 with a solid content of 45%.

M1-2 was mixed with a binder of an alumina sol to obtain a mixture with 3% of binder. The mixture was ball milled for 10 min to obtain a slurry N1-2 with a solid content of 45%.

N1-1 was applied onto a cordierite carrier with a specification of Φ 25.4*50.8/400 cpsi–4 mil. The materials were dried at 80° C. for 6 h and calcined at 500° C. for 2 h to obtain a catalyst, C1-1. The applied amount was 120 g/L, and the content of the precious metal was 145 g/ft³.

N1-2 was applied onto an upper layer of C1-1. The materials were dried at 80° C. for 6 h and calcined at 500° C. for 2 h to obtain a catalyst, C1. The applied amount of the upper layer was 60 g/L, and the content of the precious metal in the upper layer was 5 g/ft³. The total applied amount of the catalyst C1 was 180 g/L, and the total content of the precious metals was 150 g/ft³.

Example 1

A palladium nitrate solution and a rhodium nitrate solution were loaded onto an oxygen storage material (OSM) and aluminum oxide ($Al_2O_3$) by an equivalent volume impregnation process respectively. The materials were dried at 80° C. for 6 h, and calcined at 500° C. for 2 h. Here, the palladium material was denoted as M1-1, and the rhodium material was denoted as M1-2.

A platinum nitrate solution was loaded onto aluminum oxide ($Al_2O_3$) by an equivalent volume impregnation process. The materials were dried at 80° C. for 6 h and calcined at 500° C. for 2 h to obtain a product denoted as M2-1.

A copper nitrate solution was loaded onto SSZ-13 molecular sieves by an ion exchange process. The materials were dried at 80° C. for 6 h and calcined at 500° C. for 2 h to obtain a product denoted as M2-2.

M1-1 was mixed with a binder of an alumina sol to obtain a mixture with 3% of binder. The mixture was ball milled for 10 min to obtain a slurry N1-1 with a solid content of 45%.

M1-2 was mixed with a binder of an alumina sol to obtain a mixture with 3% of binder. The mixture was ball milled for 10 min to obtain a slurry N1-2 with a solid content of 45%.

M2-1 was mixed with a binder of an alumina sol to obtain a mixture with 3% of binder. The mixture was ball milled for 10 min to obtain a slurry N2-1 with a solid content of 40%.

M2-2 was mixed with a binder of an alumina sol to obtain a mixture with 5% of binder. The mixture was ball milled for 10 min to obtain a slurry N2-2 with a solid content of 40%.

N1-1 was applied onto a former half segment of a cordierite carrier with a dimension of Φ 25.4*101.6/400 cpsi–4 mil. The materials were dried at 80° C. for 6 h and calcined at 500° C. for 2 h to obtain a catalyst, C2-1. The applied amount was 120 g/L, and the content of the precious metal was 145 g/ft³.

N1-2 was applied onto an upper layer of C2-1. The materials were dried at 80° C. for 6 h and calcined at 500° C. for 2 h to obtain a catalyst, C2-2. The applied amount of the upper layer was 60 g/L, and the content of the precious metal in the upper layer was 5 g/ft³. The total applied amount of the former segment catalyst was 180 g/L, and the total content of the precious metals was 150 g/ft³.

N2-1 was applied onto a latter half segment of the cordierite carrier. The materials were dried at 80° C. for 6 h and calcined at 500° C. for 2 h to obtain a catalyst, C2-3. The applied amount was 60 g/L, and the content of the precious metal was 3 g/ft³.

N2-2 was applied onto an upper layer of C2-3. The materials were dried at 80° C. for 6 h and calcined at 500° C. for 2 h to obtain a catalyst, C2-4. The applied amount was 120 g/L. The total applied amount of the latter segment was 180 g/L.

The catalyst prepared above was denoted as C2.

Example 2

N1-1 of Example 1 was applied onto a former two thirds segment of a cordierite carrier with a dimension of Φ

25.4*76.2/400 cpsi–4 mil. The materials were dried at 80° C. for 6 h and calcined at 500° C. for 2 h to obtain a catalyst, C3-1. The applied amount was 120 g/L, and the content of the precious metal was 145 g/ft$^3$.

N1-2 of Example 1 was applied onto an upper layer of C3-1. The materials were dried at 80° C. for 6 h and calcined at 500° C. for 2 h to obtain a catalyst, C3-2. The applied amount of the upper layer was 60 g/L, and the content of the precious metal in the upper layer was 5 g/ft$^3$. The total applied amount of the former segment catalyst was 180 g/L, and the total content of the precious metals was 150 g/ft$^3$.

N2-1 of Example 1 was applied onto a latter one third segment of the cordierite carrier. The materials were dried at 80° C. for 6 h and calcined at 500° C. for 2 h to obtain a catalyst, C3-3. The applied amount was 60 g/L, and the content of the precious metal was 3 g/ft$^3$.

N2-2 of Example 1 was applied onto an upper layer of C3-3. The materials were dried at 80° C. for 6 h and calcined at 500° C. for 2 h to obtain a catalyst, C3-4. The applied amount was 120 g/L. The total applied amount of the latter segment was 180 g/L.

The catalyst prepared above was denoted as C3.

Example 3

N1-1 of Example 1 was applied onto a former two thirds segment of a cordierite carrier with a dimension of Φ 25.4*76.2/400 cpsi–4 mil. The materials were dried at 80° C. for 6 h and calcined at 500° C. for 2 h to obtain a catalyst, C4-1. The applied amount was 120 g/L, and the content of the precious metal was 145 g/ft$^3$.

N1-2 of Example 1 was applied onto an upper layer of C4-1. The materials were dried at 80° C. for 6 h and calcined at 500° C. for 2 h to obtain a catalyst, C4-2. The applied amount of the upper layer was 60 g/L, and the content of the precious metal in the upper layer was 5 g/ft$^3$. The total applied amount of the former segment catalyst was 180 g/L, and the total content of the precious metals was 150 g/ft$^3$.

N2-1 of Example 1 was applied onto a latter one third segment of the cordierite carrier. The materials were dried at 80° C. for 6 h and calcined at 500° C. for 2 h to obtain a catalyst, C4-3. The applied amount was 60 g/L, and the content of the precious metal was 3 g/ft$^3$.

N2-2 of Example 1 was applied onto an upper layer of C4-3. The materials were dried at 80° C. for 6 h and calcined at 500° C. for 2 h to obtain a catalyst, C4-4. The applied amount was 150 g/L. The total applied amount of the latter segment was 210 g/L.

The catalyst prepared above was denoted as C4.

Example 4

N1-1 of Example 1 was applied onto a cordierite carrier with a dimension of Φ 25.4*50.8/400 cpsi–4 mil. The materials were dried at 80° C. for 6 h and calcined at 500° C. for 2 h to obtain a catalyst, C5-1. The applied amount was 120 g/L, and the content of the precious metal was 145 g/ft$^3$.

N1-2 of Example 1 was applied onto an upper layer of C5-1. The materials were dried at 80° C. for 6 h and calcined at 500° C. for 2 h to obtain a catalyst, C5-2. The applied amount of the upper layer was 60 g/L, and the content of the precious metal in the upper layer was 5 g/ft$^3$. The total applied amount of the former pole catalyst was 180 g/L, and the total content of the precious metals was 150 g/ft$^3$.

N2-1 of Example 1 was applied onto a cordierite carrier with a dimension of Φ 25.4*25.4/400 cpsi–4 mil. The materials were dried at 80° C. for 6 h and calcined at 500° C. for 2 h to obtain a catalyst, C5-3. The applied amount was 60 g/L, and the content of the precious metal was 3 g/ft$^3$.

N2-2 of Example 1 was applied onto an upper layer of C5-3. The materials were dried at 80° C. for 6 h and calcined at 500° C. for 2 h to obtain a catalyst, C5-4. The applied amount was 150 g/L. The total applied amount of the latter pole catalyst was 210 g/L. The content of the precious metal was 3 g/ft$^3$.

The catalyst prepared above was denoted as C5.

Activity evaluation test was performed on the catalysts of the above Examples and Comparative Example under conditions as shown below:

simulated volume composition of gases in the tail gas of a natural gas engine: $CH_4$: 1000 ppm; CO: 4000 ppm; NO: 1000 ppm; $O_2$: 3500 ppm; $H_2O$: 10%; $CO_2$: 10%; $N_2$: balance gas; space velocity: 40000 h$^{-1}$ (calculated according to the TWC volume). The conversion rates of various pollutants at 450° C. are shown in Table 1.

TABLE 1

Conversion rates of various pollutants at 450° C. for catalysts prepared in different examples.

| Catalyst | $CH_4$ conversion (%) | CO conversion (%) | NO conversion (%) | $NH_3$ production (ppm) |
|---|---|---|---|---|
| C1 (Comparative Example) | 99.2 | 93.0 | 99.8 | 70 |
| C2 (Example 1) | 99.6 | 94.6 | 99.6 | 2 |
| C3 (Example 2) | 99.4 | 93.8 | 99.2 | 5 |
| C4 (Example 3) | 99.3 | 93.3 | 99.5 | 3 |
| C5 (Example 4) | 99.3 | 93.2 | 99.5 | 3 |

It can be seen from Table 1 that:

1) the catalyst C1 prepared in Comparative Example had high conversion rates for all three pollutants, CO, $CH_4$ and NO, with an average conversion rate exceeding 90%, but the catalyst C1 had a high emission of byproduct $NH_3$, far beyond the emission limit of the China VI phase regulation (10 ppm);

2) after the second catalyst was added, all the productions of byproduct $NH_3$ for the catalysts of C1, C2, C3 and C4 was reduced to 10 ppm or less, and the $CH_4$ and CO conversion rates for the catalysts of C1, C2, C3 and C4 were increased to some extent because the second catalyst could convert $CH_4$ and CO to some extent; however, because the oxidization of $NH_3$ by the second catalyst produced some NO, the NO conversion rates for the catalysts of C1, C2, C3 and C4 were slightly reduced;

3) a comparison between the catalyst C2 prepared in Example 1 and the catalyst C1 prepared in Comparative Example shows that the second catalyst was added in the silver catalyst C2, and the $NH_3$ emission was significantly reduced;

4) a comparison between the catalyst C2 prepared in Example 1 and the catalyst C3 prepared in Example 2 shows that the volume ratio of the first catalyst to the second catalyst was adjusted; after the proportions of the second catalyst and the first catalyst were increased, the $NH_3$ emission was slightly reduced, while the conversion rates of CO, $CH_4$ and NO were slightly increased;

5) a comparison between the catalyst C3 prepared in Example 2 and the catalyst C4 prepared in Example 3 shows that the content ratio of the upper layer to the lower layer in the second catalyst was adjusted; when the content of the upper layer was increased, the $NH_3$ emission was slightly reduced, while the NO conversion rate was slightly increased, but the conversion rates of CO and $CH_4$ were slightly reduced; and 6) a comparison between the catalyst C4 prepared in Example 3 and the catalyst C5 prepared in Example 4 shows that in comparison with the bipolar catalyst, the unipolar segmented catalyst had an essentially comparable activity and substantially the same conversion rates for various polluting gases under a condition with the same oxygen content.

The above experiments demonstrate that: for the tail gas treatment catalyst of the present invention, the first catalyst and the second catalyst work in cooperation with each other; the first catalyst can purify NO, HC, CO and PM in the tail gas, and the second catalyst can purify the originally emitted $NH_3$ in the tail gas and the byproduct $NH_3$ of the first catalyst catalysis and purify NO, HC and CO which are not completely reacted in the former segment purification; the purification is efficient, and can significantly reduce the contents of various polluting gases, especially the new byproduct $NH_3$, in the tail gas, thereby meeting the emission requirements of the China VI phase.

EXPERIMENTAL EXAMPLE

The applied volumes of the first catalyst and the second catalyst in Example 1 are changed, and experiments are performed for evaluating the activities. The conditions for the experiments are as follows:
simulated volume composition of gases in the tail gas of a natural gas engine: $CH_4$: 1000 ppm; CO: 4000 ppm; NO: 1000 ppm; $O_2$: 3500 ppm; $H_2O$: 10%; $CO_2$: 10%; $N_2$: balance gas; space velocity: 40000 $h^{-1}$ (calculated according to the TWC volume). The conditions for the experiments and the ammonia productions are as shown in Table 2.

TABLE 2

The effect of the volume ratio of the first catalyst to the second catalyst on the $NH_3$ production

| Volume ratio of the first catalyst to the second catalyst | $NH_3$ production (ppm) |
| --- | --- |
| 1:2 | 1 |
| 1:1 | 1 |
| 2:1 | 2 |
| 3:1 | 8 |
| 5:1 | 23 |

As seen from table 3, the ammonia production will be affected by changing the volume ratio of the first catalyst to the second catalyst, and the volume ratio of the first catalyst to the second catalyst is preferably (1-3):(1-2).

The invention claimed is:

1. A tail gas treatment catalyst, characterized in that, the catalyst consists of a carrier, a first catalyst, and a second catalyst, wherein the first catalyst and the second catalyst are on opposite ends of the carrier, the first catalyst is capable of purifying $CH_4$, NMHC, CO and $NO_x$ in the tail gas, and the second catalyst is capable of purifying a byproduct of $NH_3$ obtained after purification by the first catalyst and a portion of pollutants which are not completely purified by the first catalyst, wherein:
the second catalyst has a double-layer structure, comprising:
a lower layer consisting of an oxygen storage material, aluminum oxide and a first active component, wherein the first active component is a composition of Pt and Pd, or a composition of Ce, Fe, Ni and Cu; and
an upper layer consisting of a molecular sieve and a second active component, wherein the second active component is Cu, or a composition of Cu and Fe.

2. The tail gas treatment catalyst according to claim 1, characterized in that, a combined loading amount of both the upper layer and the lower layer of the second catalyst is 100-300 g/L, wherein a loading amount ratio of the upper layer to the lower layer is (0.1-10):1.

3. The tail gas treatment catalyst according to claim 1, wherein the first active component is the composition of Pt and Pd, in a weight ratio of Pt to Pd of (10-1):(1-0).

4. The tail gas treatment catalyst according to claim 1, characterized in that, a content of the second active component in the lower layer of the second catalyst is 0.1-10 $g/ft^3$.

5. The tail gas treatment catalyst according to claim 1, characterized in that, the molecular sieve is one of Beta, ZSM-5, SSZ-13 or SAPO-34 small pore molecular sieve, or a combination thereof.

6. The tail gas treatment catalyst according to claim 1, characterized in that the first catalyst comprises an oxygen storage material, aluminum oxide, and a third active component, wherein the third active component is a composition of Pt, Pd and Rh.

7. The tail gas treatment catalyst according to claim 6, characterized in that a weight ratio of Pt, Pd and Pd in the first third active component is (0-50):(1-100):(1-10).

8. The tail gas treatment catalyst according to claim 1, characterized in that, a volume ratio of the first catalyst to the second catalyst is (0.5-10):1.

9. The tail gas treatment catalyst according to claim 1, wherein the first catalyst further comprises an auxiliary agent comprising cerium oxide, cerium nitrate or barium nitrate.

10. The tail gas treatment catalyst according to claim 9, wherein the auxiliary agent comprises cerium oxide.

11. A natural gas vehicle including the tail gas treatment catalyst according to claim 1, configured to purify a tail gas of the natural gas vehicle.

* * * * *